Figure 4:
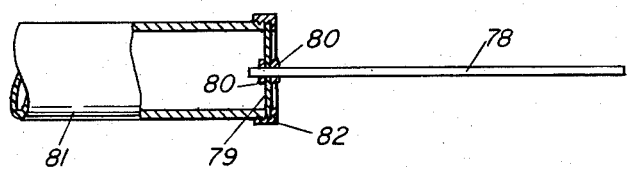

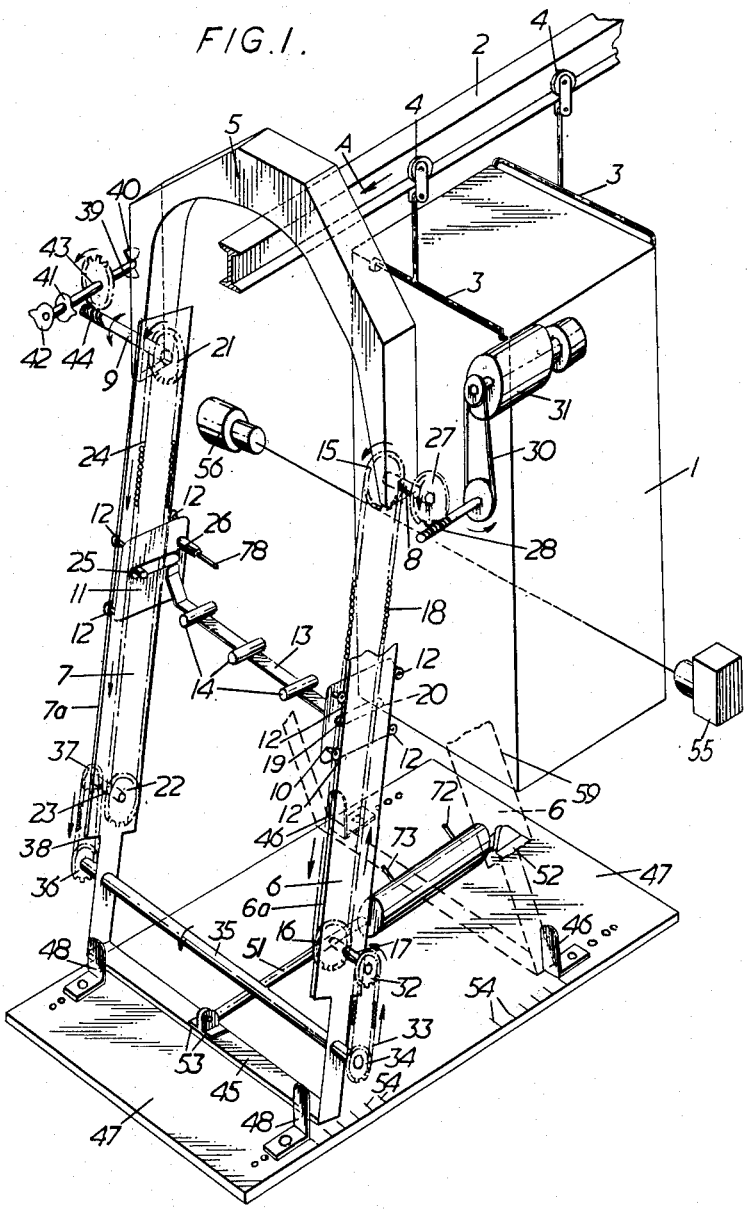

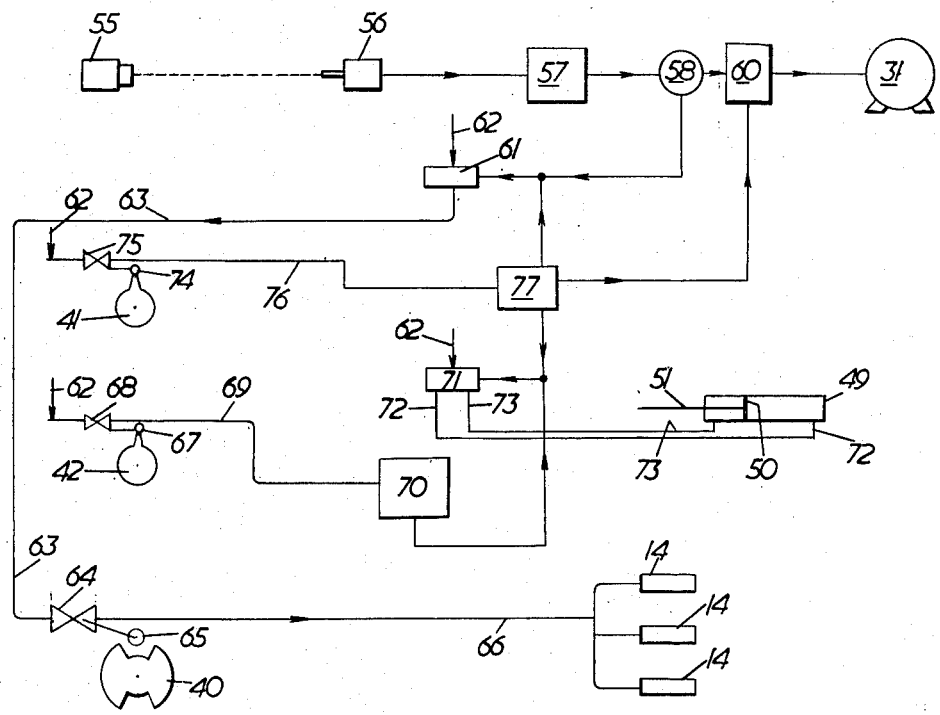

April 23, 1963    H. R. J. KNIGHT    3,086,495
COATING APPARATUS

Filed May 10, 1960    3 Sheets-Sheet 3

*Inventor*
HOWARD R. J. KNIGHT

By *Imrie & Smiley*
*Attorneys*

United States Patent Office 3,086,495
Patented Apr. 23, 1963

3,086,495
COATING APPARATUS
Howard Richard James Knight, Leamington Spa, England, assignor, by mesne assignments, to Howard Vincent Schweitzer, Cleveland, Ohio
Filed May 10, 1960, Ser. No. 28,030
Claims priority, application Great Britain May 12, 1959
11 Claims. (Cl. 118—2)

This invention relates to coating apparatus and in particular, to apparatus for coating a succession of substantially vertical walls of articles connected in spaced relation by conveying means actuated at a substantially constant rate, the vertical walls being disposed substantially at right angles to the direction of travel of the articles.

With conventional coating equipment, the walls of articles on a conveyor which are substantially parallel to the direction of movement of the articles, and the tops of the articles can be coated without rotating the articles as they move along the conveyor. In order to coat walls which are substantially at right angles to the direction of movement of the articles, it has been necessary to rotate the articles until these walls are located substantially in the direction of movement of the conveyor. This requires complicated equipment for supporting and rotating articles on the conveyor, and if the articles have an irregular shape, considerable difficulty is experienced in handling the articles on the conveyor in order to coat all the walls evenly and uniformly.

It is a main object of the present invention to provide apparatus for coating walls of articles which are disposed substantially at right angles to the direction of travel of the articles without stopping the conveyor on which the articles are supported, or rotating the articles on the conveyor.

According to the invention, there is provided an apparatus for coating a succession of substantially vertical walls of articles connected in spaced relation by conveying means actuated at a substantially constant rate, said vertical walls being disposed substantially at right angles to the direction of travel of the articles, comprising supporting means for a spray gun carriage, said supporting means being disposed outside the path of travel of the articles, being pivotally mounted on a horizontal axis, and including a track along which the spray gun carriage is movable, means responsive to the presence of an article for causing the carriage to complete an excursion along the arms from an initial position outside the path of travel of the articles, across said path, and back to its initial position, actuating means for moving the supporting means through a predetermined angle about said horizontal axis when the carriage has crossed said path, the angular positions of the supporting means and the speed of the carriage being such that the spray gun or guns are maintained at a constant distance from a moving wall being coated as coating is effected and timing means for regulating the actuating means and the period during the excursion in which the guns project coating material. Preferably the horizontal axis is disposed above the path of travel of the articles.

In one embodiment of the invention the supporting means includes an arm suspended downwardly on one side of the path and having edges which constitute the track, and the spray gun carriage includes a trolley arranged to run on the track and a cross member which is fixed to the trolley and carries a spray gun or guns. The cross member may be pivotally connected to the trolley and biassed to assure a horizontal direction for the spray or sprays.

In another embodiment of the invention the supporting means includes a pair of arms which are suspended downwardly on either side of the path of travel of the articles, each arm having edges which together constitute said track, and the spray gun carriage comprises two trolleys each arranged to run on one of the arms and a cross member connecting the trolleys and carrying a spray gun or guns.

The cross member may be pivotally connected to the trolleys and may be biassed to assure a horizontal direction for the sprays.

In the first embodiment the means for causing the carriage to complete an excursion along the track may include a sprocket at or near each end of the arm, one of the sprockets being connected to a driving device, an endless chain passing over the sprockets, and a drive dog mounted on the endless chain for engagement in a slot in the trolley.

Further, according to the invention in the second embodiment the means for causing the carriage to complete an excursion along the track may include for each arm a sprocket at or near each end of the arm, an endless chain passing over the sprockets, a drive dog mounted on each endless chain for engagement in a slot in the trolley which is mounted on that arm, the corresponding sprockets at one end of both the arms are in driving engagement, and the sprocket at the other end of one of the arms is connected to a driving device, whereby the two endless chains are driven at the same speed and the two trolleys move along the arms together.

Still further, according to the invention the actuating means for moving the arm or arms may include a double acting cylinder and piston, the cylinder being fixed and the piston being attached to the arm or arms at a point thereof remote from the horizontal axis, said piston and cylinder being operable to move the arm or arms through the predetermined angle about the horizontal axis. The movement of the arm or arms may be limited by stops against which the arm or arms abut in a first position during movement of the spray gun carriage in one direction from its initial position, and against which the arm or arms abut in a second position during movement of the carriage in the opposite direction back to its initial position.

Further, according to the invention a sensing device is disposed to be responsive to the presence of an article and is connected to the driving device to initiate operation thereof when an article is sensed, and pneumatic valves are operable by cams controlled by the driving device to control the supply of compressed air to the spray guns, the movement of the piston in the cylinder to move the arm or arms from the first position to the second position thereof when the carriage reaches the end of its excursion along the arm or arms from its initial position and to return the arm or arms to the first position when the carriage has returned to its initial position, and the stopping of the driving device when the carriage has returned to its initial position.

The sensing device may comprise a photo-electric device mounted on one side of the path of the articles to receive a control beam emanating from a source on the other side of the path, the photo-electric device being arranged to give an output signal when the control beam is interrupted by the passage of an article between the source and the photo-electric device.

A safety probe may be attached to the spray gun carriage and connected to a control mechanism which is operable to stop the conveyor and the driving device if an article contacts the probe.

Figure 3:
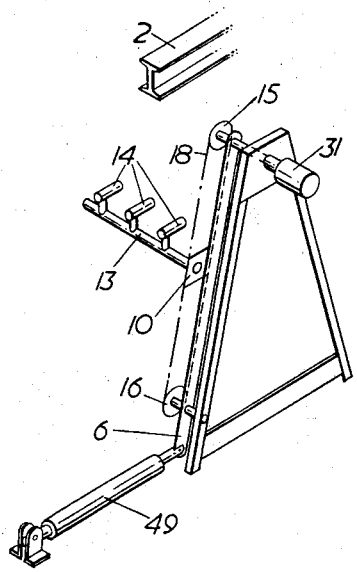

In order that the invention may be clearly understood, some embodiments thereof will now be described by way of example with reference to the accompanying drawings in which:

FIGURE 1 is a view in perspective of coating apparatus according to the invention for coating articles supported on an overhead conveyor, FIGURE 2 is a schematic diagram of apparatus for controlling the coating apparatus of FIGURE 1, FIGURE 3 illustrates diagrammatically a modified form of the apparatus of FIGURE 1, and FIGURE 4 illustrates in detail a safety probe also shown in FIGURE 1.

Referring to FIGURE 1 of the drawings, a succession of articles 1 to be coated, for example refrigerator cabinets, are suspended in spaced relation from a conveyor rail 2, by suspension hooks 3, which are attached to wheels 4 which run on the conveyor rail 2. In FIGURE 1, one article to be coated is shown and this article is square in plan. The wheels 4 are moved along the rail 2 in the direction of arrow "A" by conventional means, not shown, so that the articles move at a substantially constant rate.

Supported over the conveyor rail 2, is a rigid supporting structure 5, which has the general form of an inverted U, the distance between the legs of the U being greater than the width of the articles on the conveyor. A pair of arms 6 and 7, which form a part of supporting means for a spray gun carriage are pivotally mounted at the lower ends of the legs of the structure 5, about a horizontal axis which is disposed above the path of travel of the articles 1. The supporting means is disposed outside the path of travel of the articles, the arms 6 and 7 being suspended downwardly on either side of the path of travel. The arm 6 is pivoted about a stub shaft 8, which extends through one leg of the member 5, and the arm 7 is similarly pivoted about a shaft 9 which extends through the other leg of the member 5. The shafts 8 and 9 lie on the same horizontal axis.

A spray gun carriage connects the two arms 6 and 7, and this carriage comprises two trolleys 10 and 11, which are respectively arranged to run on the arms 6 and 7. The trolleys 10 and 11 each have four wheels 12, disposed near the corners thereof to engage the edges of the arms 6 and 7, which edges together constitute tracks 6a, 7a for the trolleys. A cross member 13, connects the two trolleys 10 and 11, and spray guns 14 are mounted on the cross member 13. The spray guns 14, are so mounted that their positions on the cross member 13 can be adjusted and the member 13 is fixed to the trolleys 10 and 11, as shown in FIGURE 1. Alternatively the member 13 may be pivotally connected to the trolleys so that the cross member 13 can move relatively to the trolleys and may be spring-biased to maintain the spray guns 14 horizontal during an excursion of the spray gun carriage to assure a horizontal direction for the sprays.

In a coating operation the spray gun carriage is moved from an initial position at the bottom of the arms 6 and 7 up to the top of the arms, and back again to its initial position and means are provided to cause the carriage to complete such an excursion along the track up and down the arms.

Two sprockets are provided on each arm mounted on the inside of the arm near each end. For the arm 6, a sprocket 15 is mounted on the stub shaft 8 at the upper end of the arm and a second sprocket 16 is mounted near the lower end of the arm on a stub shaft 17. An endless chain 18 passes over the two sprockets 15 and 16, and a drive dog 19 is mounted on the chain 18 and engages in a slot 20 in the trolley 10. Similarly for the arm 7, a sprocket 21 is mounted at the upper end of the arm on the shaft 9 and a sprocket 22 is mounted at the lower end of the arm 7 on a stub shaft 23. The axes of the shafts 17 and 23 are colinear. An endless chain 24, passes over the sprockets 21 and 22, and carries a drive dog 25, which engages in a slot 26 in the trolley 11.

A worm wheel 27 is fixed on the outer end of the stub shaft 8, and engages a worm 28, which is rotatable through a drive pulley 29 and a V-belt 30 by a driving device, which is an electric motor 31 fixed relative to the supporting structure 5. The worm 28 and worm wheel 27 forms a reduction gear. At the lower end of the arm 6, a sprocket 32 is fixed to the outer end of the shaft 17 and through a chain 33, and a further sprocket 34 drives a cross shaft 35 which extends between the lower parts of the arms 6 and 7. The shaft 35, through sprockets 36 and 37, and a chain 38, drives the sprocket 22, and therefore drives the chain 24 for the trolley 11. Thus, when the motor 31 operates, the two trolleys 10 and 11 are driven up their respective arms 6 and 7 at the same speed.

A control cam box is supported by the structure 5 at the top of the arm 7. This cam box contains a cam shaft 39, on which three cams 40, 41 and 42 are mounted, and the cam shaft 39 is driven by a reduction worm gear 43 and 44, the worm 44 being mounted on the shaft 9.

The lower extremities of the arms 6 and 7 are connected by a cross link 45.

Actuating means is provided for moving the arms through a predetermined angle about the horizontal axes of the shafts 8 and 9, from a first position in which the cross link 45 abuts against stops 46 which are mounted on a base plate 47, on one side of a vertical plane through the horizontal axes of the shafts 8 and 9, to a second position in which the cross link 45 abuts against stops 48 which as shown in FIGURE 1 are located on the other side of the vertical plane. The stops 46 and 48 are equidistant from the vertical plane. The means for moving the arms from the first position to the second position includes a double acting air cylinder 49, and piston 50 (FIGURE 2) connected to a piston rod 51. One end of the cylinder 49 is pivotally mounted on brackets 52, which are fixed to the base plate 47 and the end of the piston rod 51 is pivotally supported in brackets 53, which are mounted on the cross link 45. As will be described below, the positions of the stops 46 and 48 on the base plate 47 can be adjusted and graduations 54 are provided on the base plate for this purpose.

As an article 1, approaches the coating apparatus, the arms 6 and 7 will be in their first position in which the cross link 45 abuts the stops 46 and operation of the apparatus is initiated by the article interrupting a control beam which emanates from a source 55 on one side of the path of the articles and falls on a photo-electric device shown as a photo-electric cell 56, located on the other side of the path.

Referring to FIGURE 2 of the drawings, the photo-electric cell 56 is connected to an amplifier 57 and the output from the amplifier is connected to an adjustable timer 58. When an article interrupts the beam between the source 55 and the cell 56, a signal from the cell 56 is amplified and energises a clutch in the timer 58 to initiate operation thereof. The timer 58 provides a time delay which lasts until the front wall 59 of the article has moved to a predetermined position relative to the spray guns 14. After this time delay, the timer 58 gives an output signal to a control device 60 for the motor 31, and to a solenoid operated valve 61 which is controlled by a latching relay and which is connected to a compressed air main 62 and to a control air line 63. As the article approaches the apparatus, the piston 50 is in a retracted position in the cylinder 49 so that the arms are in their first position, and when a signal is transmitted to the motor control device 60 to start the motor 31, the front wall 59 of the article 1 is in a predetermined position relative to the spray guns 14. This predetermined position is such that when the spray gun carriage has moved until the guns 14 are opposite the bottom of the wall 59, the wall 59 is then at a required spraying distance from the spray guns 14.

When the motor 31 starts and the spray gun carriage begins to move up the arms from this initial position, the drive from the motor 31 also causes the cam shaft 39 to rotate. The cam 40 on the shaft controls operation of a valve 64 connected to the control air line 63 and which controls the supply of compressed air to the spray guns 14. A cam follower 65 cooperates with the cam 40 to control the valve 64, and the cam 40 is so designed that when the spray guns 14 are opposite the bottom of the wall 59 of the article 1 at the required spraying distance therefrom, the valve 64 is opened and control compressed air is fed on line 66 to control the spray guns 14, so that spraying of the wall 59 commences. As the spray gun carriage moves up the arms, the cam 40 maintains the valve 64 open until the spray fan reaches the top of the wall 59, and when this position is reached, the valve 64 closes and spraying stops.

Overspraying across the top of the article must be avoided as this would spoil the finish of the top surface. The spray guns 14 can be of any suitable known kind, and in the embodiment herein described the guns are fed with coating material and atomising air on feed lines not shown. The control compressed air on line 66 is operable to open a needle valve in each gun and a valve for the atomising air so that spraying begins when compressed air is applied to the guns on line 66.

The trolleys 10 and 11 continue to move up the arms 6 and 7, and when the trolleys are located over the sprockets 15 and 21, the drive dogs 19 and 25 move in the slots 20 and 26 as the dogs pass over the sprockets and movement of the trolleys back down the arms begins. When the trolleys 10 and 11 are in their uppermost position, the cam 42 through its follower 67 (FIGURE 2) causes a top limit valve 68 to open, this valve 68 being connected between the compressed air main 62 and an air line 69 which is connected to a pneumatically operated switching device 70, which is of any suitable known kind. The switching device 70 has one pair of contacts and a latching relay which is energised when the contacts close and which is connected to a two-way solenoid-operated valve 71, which is connected to the air main 62 and has two outlet lines 72 and 73 which are connected to the two ends of the cylinder 49.

When air is supplied to the switching device 70, the latching relay operates and the valve 71 supplies compressed air on the line 72 to the cylinder 49 so that the piston 50 is forced along the cylinder and the arms 6 and 7 are moved from their first position to their second position. As the spray gun carriage begins to move down the arms, the valve 68 closes but the valve 71 is held by the latching relay in the switching device 70 in its position in which air is supplied on line 72 to hold the arms 6 and 7 in their second position.

As the spray gun carriage moves up the arms, the article 1 is moving towards the spray guns 14 with a constant speed and the angle at which the arms are tilted when the arms are in their first position is such that the guns are maintained at a constant distance from the wall 59, which is being coated. When the spray guns reach their top position, the arms are moved to their second position by the piston and cylinder 49 and 50, and as the spray guns move back down the arms, the wall 59 is still approaching and is still maintained at the same constant distance from the spray guns 14.

When the spray guns were at their top position, there is no control air on line 66, but when the spray guns 14 are again in a position in which the spray fans just reach the top of the wall 59, the cam 40 opens the valve 64 and control compressed air is again fed to the guns 14. The valve 64 is maintained open by the cam 40 until the guns 14 are again opposite the bottom of the wall 59, and the wall 59 receives two coats of coating material. Movement of the spray gun carriage continues until it returns to its initial position and the cam 41 on the shaft 39 then operates, through a cam follower 74, a valve 75 which is connected between the air main 62 and an air line 76 connected to a second pneumatically operated switching device 77, which has three pairs of contacts. One pair of these contacts is connected to the solenoid valve 61 to control the latching relay therefor, the second pair is connected to the motor control device 60 and the third pair is connected to control the relay for the solenoid valve 71. Thus, when the valve 75 is opened, the switch 77 operates to close the control valve 61, to apply a signal to the motor control device 60 to stop the motor 31 which is braked rapidly by a magnetic braking device, and to operate the solenoid valve 71 which reverses to apply compressed air on line 73 to the cylinder 49, so that the piston is pushed back in the cylinder and the arms 6 and 7 are returned to their first position in which the cross link 45 abuts the stops 46.

The valves 64, 68 and 75 each include a bleeder arrangement respectively to bleed away the pressure on lines 66, 69 and 76 as soon as the valves are closed.

The angle which the arms make with the vertical can be varied when the arms are in the first or second position, by adjusting the stops 46 and 48 on the base plate, while maintaining them equi-distant from the vertical through the horizontal axis, in order to account for different speeds of articles on the conveyor, this adjustment being made to ensure that the guns 14 are always maintained at a constant distance from the wall of the article which is being coated.

As shown in FIGURES 1 and 4, a safety probe 78 is fitted to the trolley 11 and extends into the path of the articles. This probe is fixed into the centre of a disc 79 of easily fractured material by nuts 80, and the disc 79 closes the end of an air line 81, being held over the end of the line 81 by a threaded ring 82. This air line is connected to the control system for the conveyor, and if the article to be coated approaches too near the spray guns before the spray guns have moved out of the path of the article, the article engages the probe 78, breaks the disc 79 and causes compressed air in the air line 81 to bleed away to atmosphere so that a pressure switch in a control system for the conveyor is operated and the conveyor is stopped. An interlock is provided between the conveyor control system and the motor control device so that whenever the conveyor is stopped, the motor is immediately braked and vice versa.

It will be understood that the apparatus described herein with reference to FIGURE 1 can be modified. For example, in place of stops 46, the brackets 52 which carry the cylinder 49 may be adjustable in position on the base plate 47 to account for different conveyor speeds. Further, the cross link 45 may be replaced by a tube surrounding the shaft 35 and connecting the lower ends of the arms 6 and 7. The end of the piston rod 51 would then be pivotally attached to the tube. Further, by providing a number of drive pulleys on motor 31, the speed of the spray gun carriage can be varied to account for different conveyor speeds.

In place of the fixed guns 14 as shown in FIGURE 1, a single gun may be used fitted to a cross carriage which traverses across the link 13 of the spray gun carriage. This cross carriage is traversed across the link 13 by means of an endless chain and sprockets which are driven by a lead screw or drive shaft fitted to the supporting structure 5 and driven by a separate driving device fixed to the structures. The drive to the cross carriage is such that the movement of the trolleys up the arms 6 and 7 would not be greater than the effective width of the spray gun fan during each traverse of the cross carriage.

In a further embodiment of the invention, the horizontal axis of the arms 6 and 7 may be located below the level of the top of the articles on the conveyor and spraying may then continue as the trolleys 10 and 11 move over the sprockets 15 and 21. The spray guns 14 are fixed at right angles to the direction of travel of the spray gun carriage along the arms and as the carriage slows down at the top of its movement extra coating material is applied to an area of the wall adjacent the top of the wall. However, when the arms 6 and 7 are moved from their first position to their second position the spray guns point downwardly and no coating material is applied to this area adjacent the top of the wall during the movement of the carriage back to its initial position.

In this embodiment the top sprockets 15 and 21 are so positioned on the arms that the spray fan never extends above the top of the wall, and the control air supply on line 66 is maintained as the carriage reverses in direction at the top of its movement by suitably shaping the cam 40.

In a modified form of the invention as illustrated in FIGURE 3 the supporting means for the spray gun carriage includes a single arm 6 suspended downwardly on one side of the path of travel of articles to be coated. The arm 6 has edges which constitute a track and the spray gun carriage includes a trolley 10 which runs on the track on the arm 6, and a cross member 13 which is cantilevered out from the trolley 10. The arm 6 is pivoted to an A frame which supports a motor and a cam box which contains the switches for operating the pneumatic circuits as described with reference to FIGURE 2. The motor drives a sprocket 15 at the top of the arm 6 and an endless chain 18 passes over the sprocket 15 and a lower sprocket 16. A drive dog on the chain engages in a slot in the trolley so that as the chain is driven the trolley moves up and down the arm. The single arm 6 is connected at its lower end to the double-acting pneumatic cylinder 49.

It will be understood that although in the embodiments described herein the track for the spray gun carriage is illustrated as being straight, the track may be slightly curved in order to spray slightly curved vertically disposed surfaces. The curvature of the track will match that of the surface to be coated so that the spray guns are always maintained at a constant distance from the moving wall being coated as coating is effected.

It will also be apparent that the apparatus can be arranged to paint either a wall which is approaching the spray guns or a wall which is moving away from the spray guns. Also by having spray guns which face in both directions on the spray gun carriage, it is possible to paint two walls of adjacent articles simultaneously.

Further, if desired, the apparatus according to the invention can be adapted for coating walls of articles which rest on a conveyor by inverting the apparatus as illustrated in FIGURE 1, so that the arms 6 and 7 extend upwardly from their horizontal pivot.

I claim:

1. Apparatus for coating a succession of substantially vertical walls of articles connected in spaced relation by conveying means actuated at a substantially constant rate, comprising a spray gun carriage, at least one spray gun mounted on said carriage, supporting means for the spray gun carriage, said supporting means being disposed outside the path of travel of the articles and being pivotally mounted on a horizontal axis, a track on said supporting means along which track the spray gun carriage is movable, means responsive to the presence of an article for causing the carriage to complete an excursion along the track from an initial position outside the path of travel of the articles, across the path, and back to its initial position, actuating means for moving the supporting means through a predetermined angle about said horizontal axis when the carriage has crossed said path, the angular positions of the supporting means and the speed of the carriage being such that said spray gun is maintained at a constant distance from a moving wall being coated as coating is effected, and timing means for regulating the actuating means and a period during the excursion in which the gun projects coating material.

2. Apparatus according to claim 1, wherein the horizontal axis is disposed above the path of travel of the articles.

3. Apparatus for coating a succession of substantially vertical walls of articles connected in spaced relation by conveying means actuated at a substantially constant rate, comprising an arm suspended downwardly on one side and outside the path of travel of the articles, a horizontal pivot for said arm, a track constituted by the edges of the arm, a trolley arranged to run on said track, a cross-member secured to the trolley, at least one spray gun mounted on said cross-member, means responsive to the presence of an article for causing the trolley to complete an excursion along the track to move the cross-member from an initial position outside the path of travel of the articles, across the path, and back to its initial position, actuating means for moving the arm through a predetermined angle about said horizontal axis when the cross-member has crossed said path, the angular positions of the arm and the speed of the trolley being such that said spray gun is maintained at a constant distance from a moving wall being coated as coating is effected, and timing means for regulating the actuating means and a period during the excursion in which the gun projects coating material.

4. Apparatus according to claim 3, wherein the trolley is formed with a slot, a sprocket is mounted at or near each end of the arm, a driving device is connected to one of the sprockets, an endless chain passes over the sprockets and a drive dog is mounted on the chain and engages in said slot to reciprocate the trolley along the track.

5. Apparatus for coating a succession of substantially vertical walls of articles connected in spaced relation by conveying means actuated at a substantially constant rate, comprising a pair of arms which are suspended downwardly on either side of the path of travel of the articles, a horizontal pivot for said arms, a track on each arm constituted by the edges of the arms, two trolleys arranged to run one on the track of each of said arms, a cross-member connecting the trolleys, at least one spray gun mounted on said cross-member, means responsive to the presence of an article for causing the trolleys to complete an excursion along the tracks to move the cross-member from an initial position outside the path of travel of the articles, across the path, and back to its initial position, actuating means for moving the arms through a predetermined angle about said horizontal axis when the cross-member has crossed said path, the angular position of the arms and the speed of the trolleys being such that said spray gun is maintained at a constant distance from a moving wall being coated as coating is effected, and timing means for regulating the actuating means and a period during the excursion in which the gun projects coating material.

6. Apparatus according to claim 5, wherein the trolleys are each formed with a slot and for each arm a sprocket is mounted at or near each end of the arm, an endless chain passing over the sprockets, and a drive dog mounted on each endless chain for engagement in a slot in the trolley which is mounted on that arm, the corresponding sprockets at one end of both the arms are in driving engagement, and the sprocket at the other end of one of the arms is connected to a driving device, whereby the two endless chains are driven at the same speed and the two trolleys move along the arms together.

7. Apparatus according to claim 6, wherein the actuating means for moving the arms includes a double acting cylinder and piston, the cylinder being fixed and the piston being attached to the arms at a point thereof remote from the horizontal axis, said piston and cylinder being operable to move the arms through said predetermined angle about the horizontal axis.

8. Apparatus according to claim 7, wherein the movement of the arms is limited by stops against which the arms abut in a first position during movement of the trolleys in one direction from their initial position, and against which the arms abut in a second position during movement of the trolleys in the opposite direction back to their initial position.

9. Apparatus according to claim 8, wherein said means responsive to the presence of an article includes a sensing device connected to the driving device to initiate operation thereof when an article is sensed, said apparatus further comprising a supply of compressed air, pneumatic valves operable by cams controlled by the driving device to control the supply of compressed air to the spray guns, to control the movement of the piston in the cylinder to move the arms from the first position to the second position thereof when the trolleys reach the end of their excursion along the arms from their initial position and to return the arms to their first position when the trolleys have returned to their initial position, and to control the stopping of the driving device when the trolleys have returned to their initial position.

10. Apparatus according to claim 9, wherein the sensing device comprises a photo-electric device mounted on one side of the path of the articles to receive a control beam emanating from a source on the other side of the path, the photo-electric device being arranged to give an output signal when the control beam is interrupted by the passage of an article between the source and the photo-electric device.

11. Apparatus according to claim 10, including a safety probe attached to the spray gun carriage and connected to a control mechanism which is operable to stop the conveyor and the driving device if an article contacts the probe.

References Cited in the file of this patent

UNITED STATES PATENTS

| | | |
|---|---|---|
| 998,579 | Herz | July 18, 1911 |
| 2,736,671 | Ransburg et al. | Feb. 28, 1956 |
| 2,925,801 | Bivens et al. | Feb. 23, 1960 |